(12) United States Patent
Hamilton (10) Patent No.: US 7,302,886 B2
(45) Date of Patent: Dec. 4, 2007

(54) HULLING APPARATUS AND METHOD

(76) Inventor: James C. Hamilton, 31881 Road 160, Visalia, CA (US) 93292

( * ) Notice: Subject to any disclaimer, the term of this patent is extended or adjusted under 35 U.S.C. 154(b) by 0 days.

(21) Appl. No.: 10/617,534

(22) Filed: Jul. 11, 2003

(65) Prior Publication Data

US 2005/0005784 A1 Jan. 13, 2005

(51) Int. Cl.
 *A23N 7/00* (2006.01)
 *B02B 3/00* (2006.01)
(52) U.S. Cl. ............... 99/606; 99/628; 99/627; 99/618
(58) Field of Classification Search ............. 99/605, 99/606, 607, 628, 627, 626, 617, 618, 630, 99/541, 575; 130/27 R, 304
See application file for complete search history.

(56) References Cited

U.S. PATENT DOCUMENTS

| 313,984 | A | * | 3/1885 | Burckhardt | .............. 99/620 |
| 505,002 | A | | 9/1893 | Read | |
| 831,663 | A | | 9/1906 | Grohens | |
| 1,388,026 | A | | 8/1921 | Conner | |
| 2,072,598 | A | * | 3/1937 | Kile | .............. 99/627 |
| 2,094,880 | A | | 10/1937 | Formway | |
| 2,147,022 | A | | 2/1939 | Formway | |
| 2,161,032 | A | * | 6/1939 | Formway | .............. 99/591 |
| 2,199,088 | A | * | 4/1940 | Fauth | ............ 452/149 |
| 3,347,295 | A | * | 10/1967 | Feiling | ............. 99/628 |
| 5,329,845 | A | | 7/1994 | Bichel | |
| 5,431,094 | A | | 7/1995 | Savage, Sr. | |
| 6,561,445 | B2 | | 5/2003 | Yamamoto et al. | |

\* cited by examiner

*Primary Examiner*—Reginald L. Alexander
(74) *Attorney, Agent, or Firm*—Richard A. Ryan (57) ABSTRACT

A hulling apparatus having a main frame, a moveable support frame, a rotatable drum fixed in position relative to the main frame, a housing supported by the moveable support frame and a hulling chamber formed by the placement of the drum inside the housing. A contact element having one or more brush assemblies is attached to the drum such that the bristles project into the hulling chamber to engage walnuts, pecans or other food products and remove the outer hull therefrom. The walls of the housing are formed from one or more screened panels having openings therein to pass the removed hull material and spiral members thereon to help guide the food products through the apparatus. The housing moves up and down to increase or decrease the size of the hulling chamber. The apparatus speeds the process of hulling walnuts and pecans and more effectively utilizes the brush assemblies.

33 Claims, 4 Drawing Sheets

HULLING APPARATUS AND METHOD

CROSS-REFERENCE TO RELATED APPLICATIONS

Not Applicable.

BACKGROUND OF THE INVENTION

A. Field of the Invention

The field of the present invention relates generally to apparatuses and methods for separating an outer portion of food product, such as nuts, from an inner portion of the product. More particularly, the present invention relates to apparatuses and methods, by way of example but not of limitation, for removing the outer hulls of walnuts and pecans. Even more particularly, the present invention relates to such hulling apparatuses and methods that utilize an inner, moveable conical element having brush members configured to remove the outer portion of the food product.

B. Background

Many food products have an outer, non-edible portion that covers and protects an inner portion of the food product. A common example of such food products are nuts. Some nuts, such as walnuts and pecans in particular, have a hull or husk portion that covers an inner nut portion, in which is the edible portion of the nut, commonly referred to as the nut meat. As is known in the art, walnuts and pecans are ripe when the hull still exhibits some degree of softness (i.e., such that it can be indented with the thumb or a finger). Waiting until the hull is black and mealy generally increases the possibility that the nut portion will rot. As a result, the harvesting of walnuts and pecans, which typically involves shaking the nuts from the tree, sweeping the nuts into windrows and then picking up the nuts with a harvester, is typically done when the hull portion of the nut is still a green to brown color. Once harvested, the hull portion of the walnut or pecan is removed and disposed of and the nut portion is cleaned, dried to reduce the moisture content and sorted as necessary. In commercial operations, the drying of walnuts and pecans typically involves the use of apparatuses configured to supply heated air. For non-commercial operations, the drying is achieved by storing the nut portion for several months. Once dried, the nut portion of the walnut or pecan is cracked to remove the shell from the nut meat.

In larger scale commercial operations, it is necessary to utilize an apparatus configured to remove the outer hull portion of the walnut or pecan from the inner nut portion. A number of such apparatuses are known. For instance, U.S. Pat. No. 313,984 to Burckhardt describes a conically-shaped grain hulling apparatus that utilizes rows of tufts made out of metallic brushes and arranged in spiral form on the inner portion of the shell to break and hull corn. U.S. Pat. No. 831,663 to Grohens discloses a rotatably configured conical brush disposed in a conical hulling cylinder for removing the, skin from the nut-kernels of peanuts. A nut huller for removing hulls from walnuts and other nuts is described in U.S. Pat. No. 1,388,026 to Conner. This patent discloses the use of a rotatable plate that cooperates with a horizontally arranged circular brush disposed inside a cylindrical shell to dehull the nuts. U.S. Pat. No. 2,094,880 to Formway discloses a walnut huller that transports the walnuts on an endless belt below a series of removable brushes attached to an inclined brush frame configured to remove the hull from the nut portion without penetrating the shell. U.S. Pat. No. 2,147,022, also to Formway, discloses a walnut hulling device that utilizes a plurality of cutter bars to cut into the hull prior to being engaged by the brushes. U.S. Pat. No. 5,329,845 to Bichel discloses an apparatus for hulling nuts that utilizes a rotatable roller cage comprising a plurality of roller brushes radially arranged inside a chamber to remove the semi-soft fibrous hull found on many nuts, including pistachio nuts. U.S. Pat. No. 5,431,094 to Savage, Sr. discloses the use of an endless belt having a nut engagement portion forming a nut passageway below a rotatable scrubbing mechanism. The patents described above are representative of hulling apparatuses known in the prior art that utilize contact with a brush mechanism to remove the hull of the food product.

Although the prior art discloses a number of hulling apparatuses for removing the hull of a food product to expose the inner portion of the product, there are certain characteristics of the known hulling apparatuses that limit their complete acceptance, usefulness and/or cost effectiveness. For instance, it is well known that the trash particles, such as rocks, sticks and the like, that are collected during the harvesting of walnuts and pecans damage or completely knock out part of the stationary brush mechanism, which creates a groove or channel in the bristles of the brush mechanism. A certain amount of the unhulled food products will tend to follow the path of the bristle-free groove and, as a result, will not have their hulls removed by the hulling apparatus. Because of extra handling and re-hulling and the need to shut down operations to replace the brushes on a not so infrequent basis, this effect can substantially slow the hulling process and increase the cost of hulling food products. In addition, practical limits on the size of the apparatuses substantially limit the amount of area actually available for hulling food products, which slows the ability of the hulling apparatus to handle large quantities of product. What is needed, therefore, is a hulling apparatus and method of hulling that substantially reduces or prevents the movement of unhulled food products through bristle-free grooves. Such an apparatus should provide for increased hulling area without requiring substantial increase in the hulling apparatus itself, be relatively simple to operate and provide for the replacement of brushes, albeit less frequently, as needed.

SUMMARY OF THE INVENTION

The hulling apparatus and method of hulling of the present invention solves the problems and provides the benefits identified above. That is to say, the present invention discloses a hulling apparatus particularly configured to prevent the passage of unhulled food products, such as walnuts, pecans and the like, through bristle-free grooves in the brush mechanism. In addition, the hulling apparatus of the present invention increases the area available for hulling operations. The decrease in the production of non-hulled food products, the reduction in brush replacement and the increase in hulling area result in substantially improved hulling productivity for the apparatus and method of the present invention. The hulling apparatus of the present invention is relatively easy to use and allows for the replacement of worn or damaged brushes as needed.

In one aspect of the present invention, the hulling apparatus has a main frame assembly with a plurality of upright frame members and a plurality of transverse frame members, a moveable support frame slidably mounted to the main frame for movement of the moveable support frame relative to the main frame, a jack assembly operationally attached to the moveable support frame to move the moveable support frame, a pair of shaped components and a contact element attached to the first shaped component. The preferred embodiment includes a motor and gear assembly configured to rotate a drive shaft attached to the first shaped component. The jack assembly can comprise a pair of worm gear screw jacks attached to the moveable support frame. The pair of shaped components includes a first shaped component rotatably attached to the main frame and a second shaped component attached to the moveable support frame. Preferably, the moveable support frame is slidably mounted in spaced juxtaposition on a pair of upright frame members and a cross-member is disposed between the pair of vertical channel members. The second shaped member has one or more screened panels with a plurality of openings therein for passing at least a portion of the outer hull portion of the food products from the hulling chamber after separation from the food products.

In the preferred embodiment described below, both shaped component are generally conically-shaped with the first shaped component substantially disposed in the second shaped component so as to define a generally conical hulling chamber between the pair of shaped components. The hulling chamber has a product path therebetween for passage of the food products, which preferably pass by way of gravitational forces, through the hulling apparatus during movement of the first shaped component and/or the second shaped component relative to each other. The screened panels have at least one downwardly extending spiral member engageable by the food products in the hulling chamber so as to guide movement of the food product along the product path. At least a portion of the contact element, which preferably comprises a brush assembly having a panel with a plurality of bristles projecting therefrom, is disposed in the hulling chamber between the first shaped component and the second shaped component. The brush assembly is configured to engage the food products to remove the outer hull portion of the food products from the inner shell portion while passing the food products through the hulling chamber.

Accordingly, the primary objective of the present invention is to provide an improved hulling apparatus and method of using the same that provides the advantages discussed above and that overcomes the disadvantages associated with presently available hulling apparatuses.

It is also an important objective of the present invention to provide a hulling apparatus and method that substantially reduces the passage of unhulled food products through any bristle-free grooves that arise in the brush mechanism.

It is also an important objective of the present invention to provide a hulling apparatus that increases the area for hulling operations without a corresponding increase in the size of the hulling apparatus.

It is also an important objective of the present invention to provide a hulling apparatus and method that is easy to use, adaptable for a variety of food products and effective at removing the hulls from such food products.

It is also an important objective of the present invention to provide a hulling apparatus that utilizes a rotating conical drum having one or more replaceable brush mechanisms attached thereto disposed in a hulling chamber enclosed by a conical housing adapted to discharge the removed hulls and which is configured for the conical housing to move vertically relative to the drum as needed to improve hulling operations.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, and particularly with reference to the embodiment of the hulling apparatus of the present invention illustrated in the figures, the preferred embodiments of the present invention are set forth below. The enclosed figures and drawings are merely illustrative of the preferred embodiments and represent several different ways of configuring the present invention. Although specific components, materials, configurations and uses of the present invention are illustrated and set forth in this disclosure, it should be understood that a number of variations to the components and to the configuration of those components described herein and in the accompanying figures can be made without changing the scope and function of the invention set forth herein.

A preferred embodiment of the hulling apparatus of the present invention, identified generally as 10 in the figures, primarily comprises pair of shaped components, a first shaped component, which is a rotating substantially conically-shaped drum 12 in the preferred embodiment, disposed within a second shaped component, which is a substantially conically-shaped housing 14 in the preferred embodiment, forming a hulling chamber 16 therebetween in which is positioned one or more contact elements 18 on drum 12. The shaped components 12 and 14 are supported by main frame 20. Food products 22, such as freshly harvested walnuts and pecans having an outer hull portion 22a and an inner shell portion 22b, travel through hulling apparatus along product path 24 from product receiving inlet 26 to product discharge outlet 28. In the preferred embodiment, unhulled product 22 is fed or deposited into inlet 26 by a conveyor assembly, not shown, mounted in supply relationship to inlet 26 above hulling chamber 16, as known in the art and may be best visualized by reference to FIG. 3. The discharged hulled food products, inner shell portions 22b, are washed in the rotating washer assembly 30, commonly referred to as a squirrel cage assembly. As explained in more detail below, the removed outer hull portions 22a follow hull path 32 after being separated from food products 22. The typical rotating washer assembly 30 comprises a plurality of jets or other spraying mechanisms, not shown, that are configured to direct a relatively high pressure spray of cleaning fluids, typically water, at the hulled inner shell portions 22b that have been discharged from apparatus 10. After being washed to further remove outer hull portions 22a as necessary and clean inner shell portions 22b, inner shell portions 22b are sent to a drying unit, also not shown, for drying prior to being cracked to remove the nut meat from inner shell portion 22b.

Figure 1:
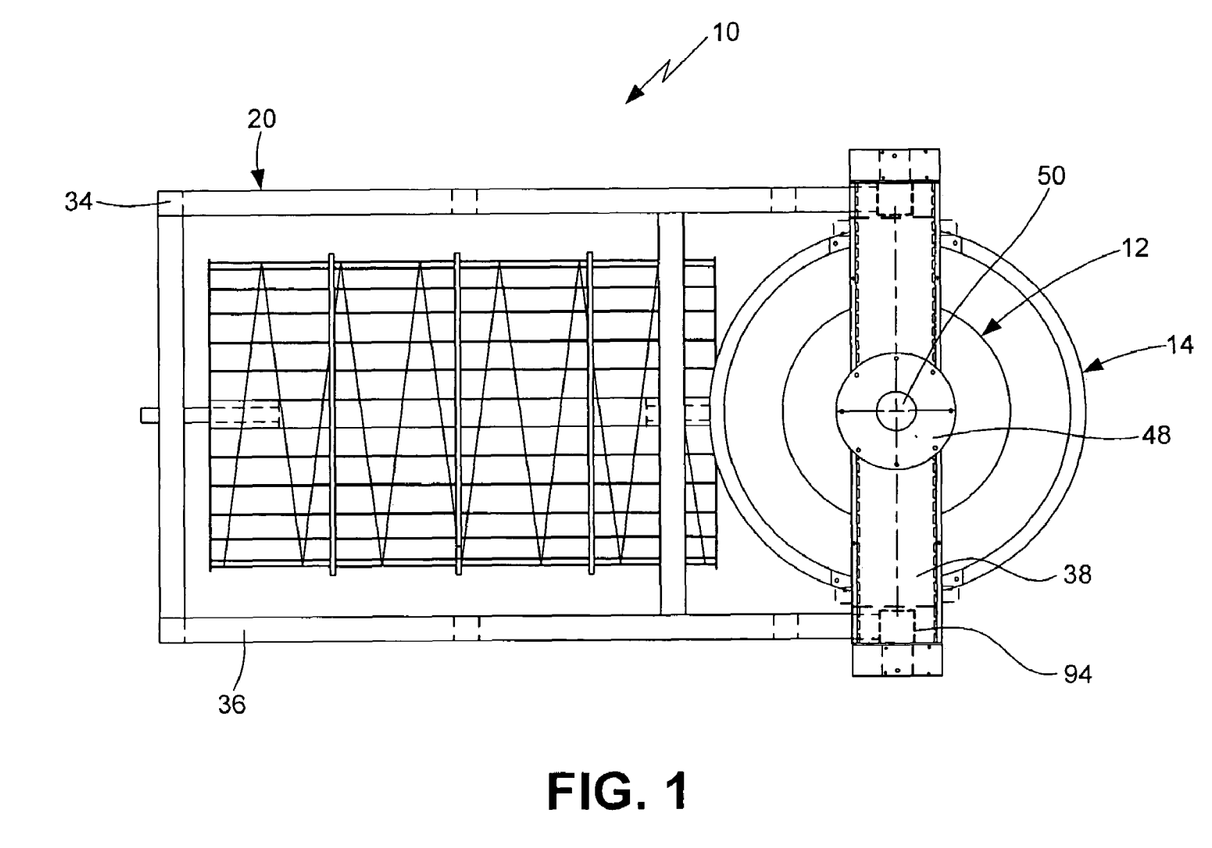
FIG. 1 is a top plan view of the hulling apparatus of the present invention operable in the practice of the invention.
Figure 2:
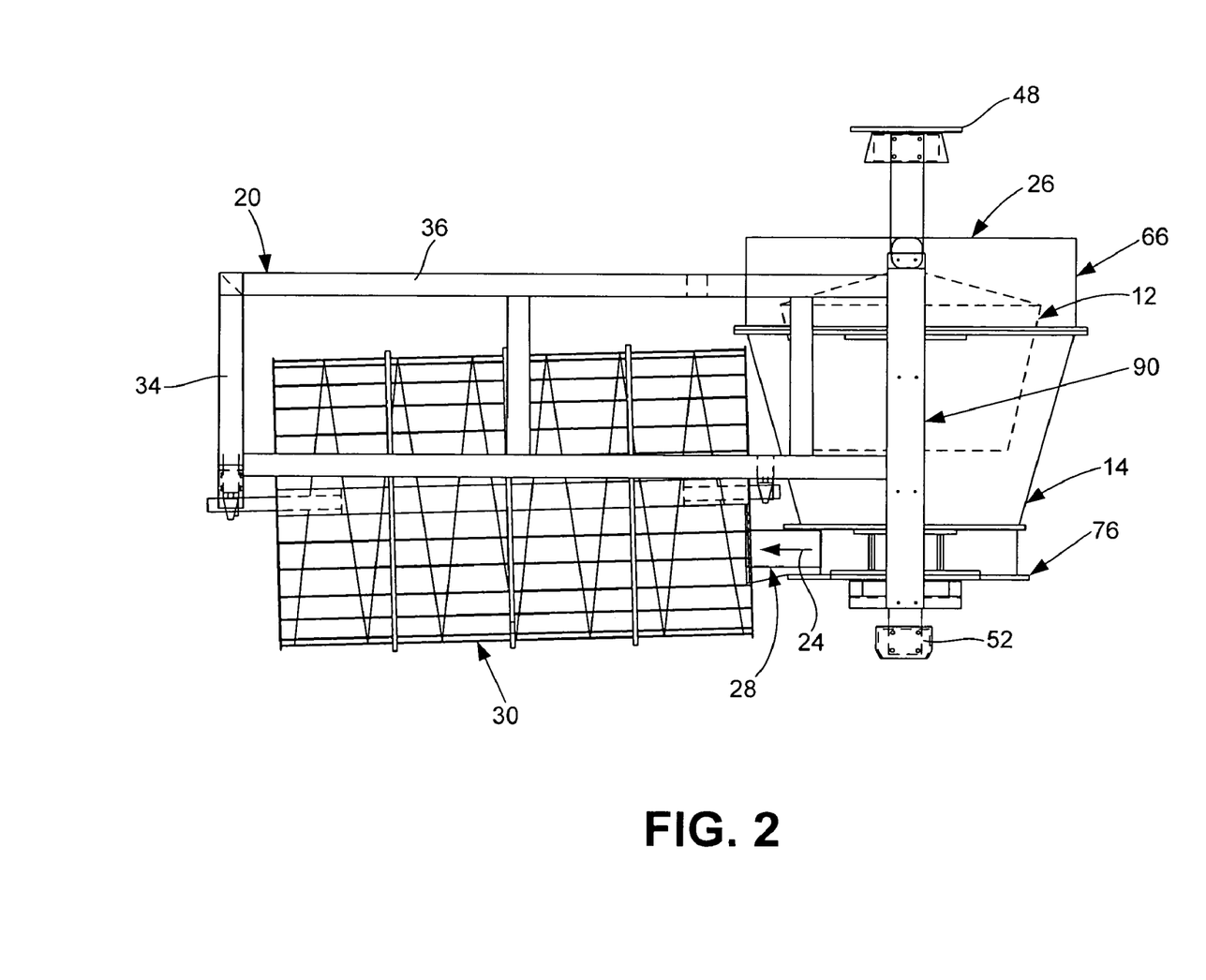
FIG. 2 is a side elevation view of the apparatus shown in FIG. 1.
Figure 3:
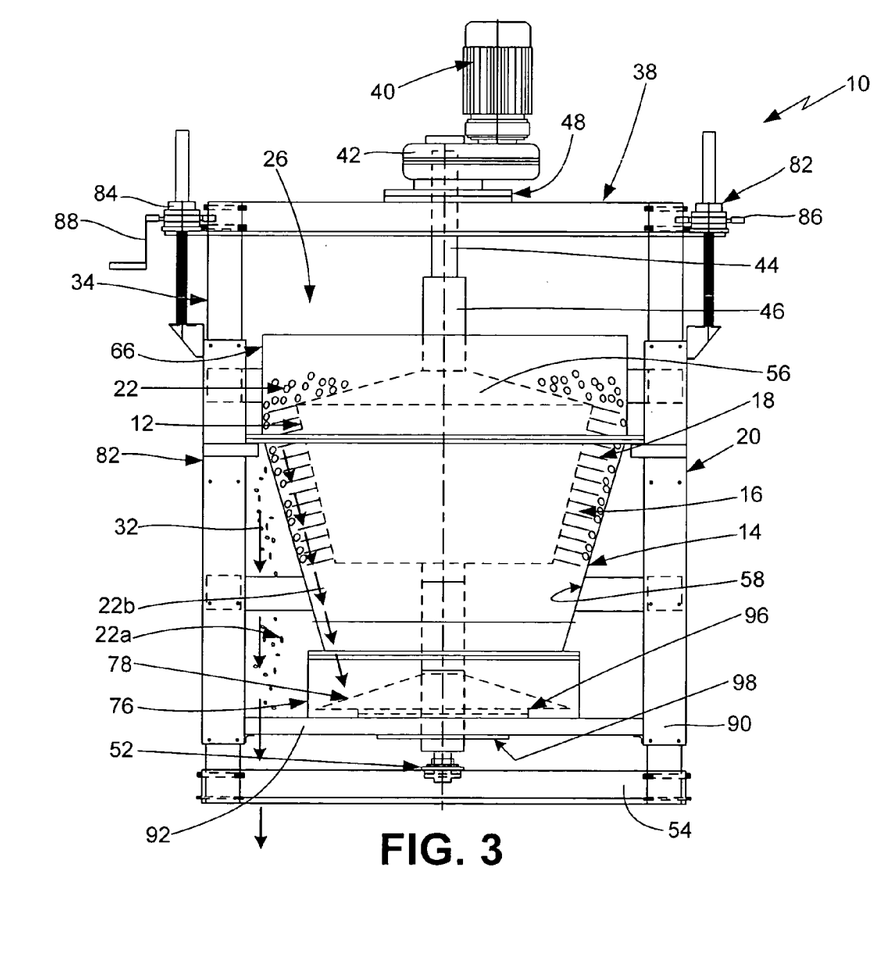
FIG. 3 is a front elevation view of the apparatus shown in FIG. 1.
Figure 4:
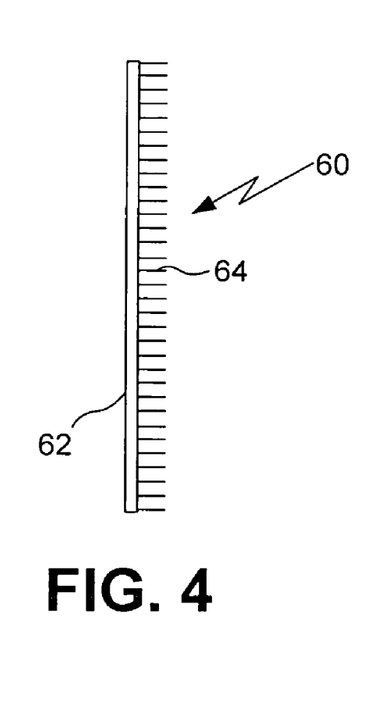
FIG. 4 is a side view of a brush assembly utilized with the apparatus of FIG. 1.

As shown in the figures, the preferred main frame 20 comprises a plurality of upright frame members 34 and a plurality of transverse frame members 36 connected together in spaced apart relation to support the various components of hulling apparatus 10, including the rotating washer assembly 30, as shown in the figures. Although a wide variety of materials are suitable for main frame 20, steel and other metals are typically preferred due to their strength and durability. Frame members 34 and 36 can be connected together by welding, rivets, bolts and/or a variety of other connecting mechanisms well known in the art. A support member 38, best shown in FIGS. 1 and 3, is positioned at the end of main frame 20 above drum 12 and housing 14 to support drive motor 40 and gear assembly 42 and to maintain rotating drum 12 in a generally vertical orientation. As shown in FIG. 3, drive motor 40, which can be electric, hydraulic or other mechanisms well known in the art, engages gear assembly 42, which is rotatably coupled to drive shaft 44, which in turn is fixedly coupled to drum shaft 46, to rotate drum 12, and the attached contact elements 18, within housing 14 to hull product 22 inside hulling chamber 16. As shown in FIGS. 1 and 2, illustrating motor 40 and gear assembly 42 removed, a support plate 48 is mounted to support member 38 to support motor 40 and gear assembly 42. Drive shaft 44 passes through hole 50 in support plate 48 to couple to drum shaft 46. Shaft bearing 52, shown in FIG. 3 mounted to bottom frame member 54, supports drum 12 and permits rotation of drum shaft 46 and drum 12 relative to frame 20.

In the preferred embodiment of the present invention, best shown in FIGS. 2 and 3, drum 12 has a shaped cap member 56 that directs food products 22 placed in inlet 26 into hulling chamber 16 where contact elements 18 will remove the hulls from food products 22. If desired, cap member 56 can be configured to be removably attached to the top of drum 12 to permit the use of alternative shapes depending on the type of food product 22 to be hulled. The preferred embodiment has contact elements 18 removably attached to the outer wall of drum 12 in a manner that results in a small gap between the ends of contact elements 18 and the inner wall, shown as 58, of housing 14. In one embodiment, contact elements 18 comprises a plurality of radially disposed brush assemblies 60, comprised of panel 62 having a plurality of wire bristles 64 projecting from one side of panel 62, that are configured to be individually mounted to drum 12. Preferably, panels 62 are configured to be removably attached to drum 12 such that bristles 64 of panels 62 project away from drum 12 into hulling chamber 16 toward inner wall 58 of housing 14. It is preferred that panels 62 be relatively easy to remove so that they may be repaired or replaced as necessary due to wear on bristles 64 that results from the hulling of food products 22 and the trash materials that are invariably collected with them during harvesting. In one embodiment, panels 62 attach to drum 12 with the use of easy accessible bolts or screws. As is well known in the art, it is necessary to configure brush assemblies 60 to tear away the non-desired outer hull portion 22a, such as the relatively soft outer hull of walnuts and pecans, without damaging the inner shell portion 22b or nut meat underneath. One commonly utilized material for panels 62 is sheet metal with bristles 64 formed from equal lengths of metal wire that substantially covers panels 62. As desired, based on the type of food products to be hulled and other considerations, other materials and configurations may be utilized for brush assemblies 60.

Figure 5:
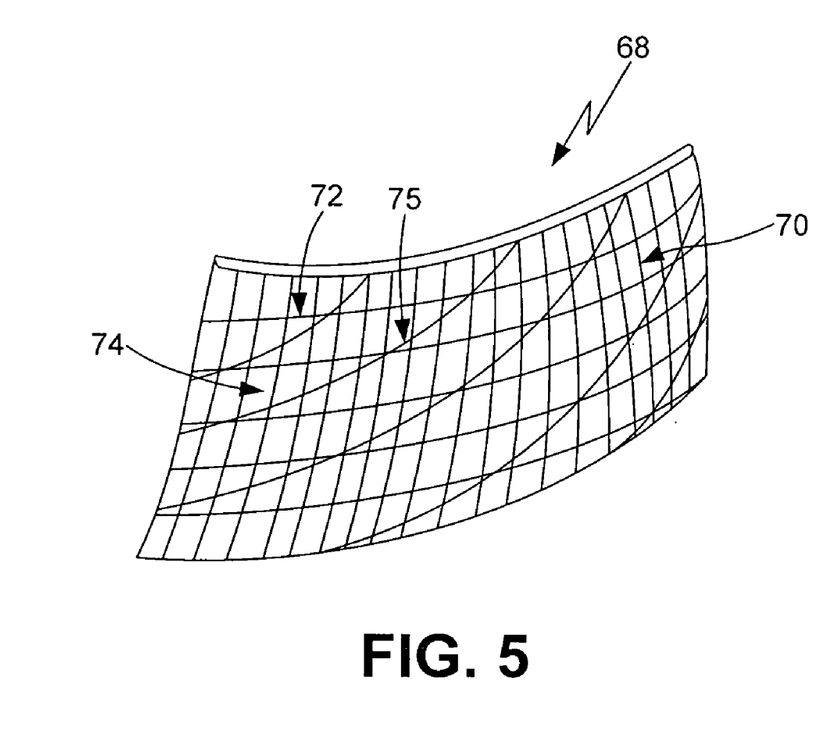
FIG. 5 is a isometric view of a screened panel configured for use with the apparatus of FIG. 1.

In the preferred embodiment, best shown in FIG. 3, upper portion 46a of drum shaft 46 connects to cap member 46 and lower portion 46b of drum shaft 46 connects to shaft bearing 52 on bottom frame member 54. In the preferred embodiment drum 12 is rotated around its substantially vertical axis, identified by reference number 55 in FIG. 3, by drive motor 40 and gear assembly 42 in a generally fixed vertical position. Housing 14, which has generally the same conical shape of drum 12, is open at its top to form inlet 26. As shown in FIGS. 2 and 3, housing 14 has an extension portion 66 that functions as a surge holding area for food products 22 received through inlet 26. In this manner, food products 22 can deposited through inlet 26 and held in the surge holding area formed by extension portion 66 until they fall between contact elements 18 and housing 14 generally along product path 24. In the preferred embodiment, housing 14 is comprised of one or more screened panels 68 having a plurality of generally vertical bars 70 and a plurality of generally horizontal bars 72 with a plurality of openings 74 therebetween, as shown in FIG. 5, forming a cage-like structure. Openings 74 are sized and configured (i.e., smaller openings 74 for pecans than walnuts) to allow pieces of removed outer hull portion 22a to be pushed through openings 74 after being separated from food products 22 by contact elements 18. The separated outer hull portions 22a will generally follow hull path 32 to fall through the open main frame 20 to be collected for disposal, use as a waste by-product or other disposition. To facilitate and guide movement of food products 22 along product path 24, screened panels 68 can be provided with one or more downwardly extending spiral members 75 on the inside wall of screen panels 68, as shown in FIG. 5. In the preferred embodiment, screened panels 68 are configured to engage said food products 22 to assist with the removal of the outer hull portion 22a from inner shell portion 22b. In addition, screened panels 68 are configured to be removably interconnected so as to form housing 14. A mounting bracket assembly 76, best shown in FIG. 2, supports the bottom of housing 14 and encloses a shaped skirt member 78, best shown in FIG. 3, that is shaped and configured to direct the hulled food products 22 into outlet 28. Along with the hulled food products 22, there will be a certain amount of outer hull portions 22a and pieces thereof, which are removed during the cleaning process in washing assembly 30.

To accomplish the objectives of the present invention, hulling apparatus 10 provides for the vertical movement of housing 14. This can be accomplished by providing apparatus 10 with a jack assembly 80 attached to a moveable support frame 82. As best shown in FIG. 3, jack assembly 80 is operationally attached to moveable support frame 82 so as to raise or lower housing 14 relative to drum 12 and contact elements 18 thereon. In one configuration, jack assembly 80 comprises a first worm gear screw jack 84 and a second worm gear screw jack 86 on opposite sides of moveable support frame 82. In FIG. 3, jack assembly 80 is shown as being manually operatable by use of hand crank 88. Alternatively, jack assembly 80 can be electrically or hydraulically operated and configured to be controlled remotely. The preferred moveable support frame 82 is configured as a generally H-shaped structure having vertical channel members 90 that are in slidable relationship with a pair of forward positioned upright frame members 34 and a cross-member 92 that attaches to mounting bracket assembly 76 to supportedly move housing 14 up and down with support frame 82. As can be determined from FIG. 3, with the vertical position of drum 12 fixed, the up and down movement of housing 14 will increase or decrease the width of hulling chamber 16, which allows the user of hulling apparatus 10 to cause more or less brushing action and adjust for the wear to bristles 64 of brush assemblies 60 that results from the hulling operations, which substantially extends the useful life of brush assemblies 60. The up and down movement of housing 14 and the generally vertical product path 24 through hulling chamber 16 prevents food products 22 from following any bristle-free paths that may arise along contact elements 18. In addition, the movement of housing 14 increase the effective volume of hulling chamber 16, allowing for increased operational capacity. As best shown in FIG. 1, disposed between vertical channel members 90 and upright frame members 34 is a guiding assembly 94 for facilitating movement of support frame 82 relative to main frame 20. In the preferred embodiment, guiding assembly 94 comprises a bearing plate constructed of a material having a low coefficient of friction and a relatively high wear rate, such as an ultra-high molecular weight polymer (often referred to in the trade as a UHMW material). One surface of the bearing plate is clamped against one of the forward upright frame members 34 and the other surface is clamped against one of the vertical channel members 90 of moveable support frame 82. Use of a top bearing plate 96 and a bottom bearing plate 98 on either side of cross-member 92 of moveable support frame 82, as shown in FIG. 3, facilitates rotation of housing 14 relative to moveable support frame 82 as support frame 82 is moved up and down by jack assembly 80. Preferably, top 96 and bottom 98 bearing plates are also made from a UHMW material.

In use, drum 12 is rotated about its substantially vertical axis 55 while the operator of hulling apparatus 10 of the present invention deposits, by way of truck, basket, conveyor or other mechanism, a load of unhulled food products 22 into inlet 26, where it is collected in the extension portion 66 of housing 14. As known in the art, the rotation of drum 12 can be started after the load of food products 22 are deposited into extension portion 66. The unhulled food products 22 are directed to hulling chamber 16 by shaped cap member 56 and then drawn into hulling chamber 16 by gravitational forces and the rotating action of contact elements 18 in hulling chamber 16 to follow product path 24. As food products 22 follow product path 24 along inner wall 58 of housing 14, bristles 64 on panels 62 of brush assemblies 60 remove the outer hull portions 22a from food products 22 and force a substantial amount of the outer hull portions 22a to pass through openings 74 between the vertical 70 and horizontal bars 72 making up screened panels 68 that form the wall of housing 14. Spiral members 75 on the inside of housing 14 will generally prevent food products 22 from dropping straight through hulling chamber 16. Instead, spiral members 75 will guide food products 22 in a generally downward spiral direction, further reducing the likelihood that damage to brush assemblies 60 will result in a bristle-free path that lets non-hulled food products 22 to pass completely through hulling apparatus 10 of the present invention. The outer hull portions 22a from food products 22 generally follow hull path 32 to drop through main frame 20. Inner shell portions 22b pass through hulling chamber 16 and are directed to outlet 28 by skirt member 78 at the bottom of housing 14.

As is necessary, depending on the size of food products 22 and/or the need to compensate for wear on brush assemblies 60, the operator of hulling apparatus 10 can increase or decrease the effective size of hulling chamber 16, represented by the space between drum 12 and housing 14, as desired by operating jack assembly 80. In the configuration shown in the drawings, jack assembly 80 is manually operated by rotating hand crank 88 at first worm gear screw jack 84. Second worm gear screw jack 86 moves in conjunction with first worm gear screw jack 84 to raise or lower moveable support frame 82, including vertical channel members 90 and cross-member 92 that supports mounting bracket assembly 76 at the bottom of housing 14. Because of the corresponding conical shapes of drum 12 and housing 14, the distance is substantially even between drum 12 and housing 14 at any given horizontal location around hulling chamber 16. The upward and downward movement ability of housing 14, thereby causing an increase or decrease in hulling chamber 16 and the distance between bristles 64 and inner wall 58 of housing 14, more effectively removes outer hull portion 22a from food products 22, such as walnuts and pecans, and reduces the amount of operational down time required to change out brush assemblies 60 due to wear on bristles 64. Easily removable panels 62 permit quick replacement of brush assemblies as necessary.

Configured as described above, hulling apparatus 10 of the present invention has a much increased volumetric area, the hulling chamber 16, for hulling of food products 22. For instance, the typical prior art apparatus has approximately eight cubic feet of volume and can hull approximately eight tons per hour equivalent of dried inner shell portions 22b The amount of area for dehulling in the prior art hulling apparatuses is typically the bottleneck that prevents increased production operations. Although the apparatus 10 of the present invention is configured to be approximately the same overall dimensions as the prior art apparatuses, hulling apparatus 10 has approximately thirty-six cubic feet of volume that can process approximately twenty-four tons per hour of equivalent dried inner shell portions 22b. The increased handling capability out of hulling apparatus 10 can substantially reduce the cost of hulling food products 22, such as walnuts, pecans and the like.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape and use.

What is claimed is:

1. A hulling apparatus for substantially removing an outer hull portion of a food product from an inner shell portion of said food product, said hulling apparatus comprising:
   a main frame assembly having a plurality of upright frame members and a plurality of transverse frame members;
   a moveable support frame slidably mounted to said main frame for movement of said moveable support frame relative to said main frame;
   a jack assembly operationally attached to said moveable support frame to move said moveable support frame;
   a pair of shaped components having a first shaped component rotatably attached to said main frame and a second shaped component attached to said moveable support frame, said first shaped component substantially disposed in said second shaped component so as to define a hulling chamber between said pair of shaped components, said hulling chamber having a product path therebetween for passage of said food products through said hulling apparatus during movement of said first shaped component and/or said second shaped component relative to each other, said first shaped component having a shaped cap member for directing said food products into said hulling chamber; and a contact element attached to said first shaped component, at least a portion of said contact element disposed in said hulling chamber between said first shaped component and said second shaped component and configured to engage said food products so as to remove said outer hull portion of said food products from said inner shell portion while passing said food products through said hulling chamber.

2. The hulling apparatus according to claim 1, wherein said moveable support frame is slidably connected to one or more of said upright frame members.

3. The hulling apparatus according to claim 2, wherein said moveable support frame comprises a pair of vertical channel members slidably mounted in spaced juxtaposition on a pair of upright frame members and a cross-member disposed between said pair of vertical channel members.

4. The hulling apparatus according to claim 1 further comprising a support member attached to said main frame above said moveable support frame and a bottom frame member spatially opposite said support frame below said moveable support frame.

5. The hulling apparatus according to claim 4, wherein said first shaped component is rotatably disposed between said support member and said bottom frame.

6. The hulling apparatus according to claim 1, wherein said first shaped component and said second shaped component are conically shaped so as to define a substantially conical hulling chamber therebetween.

7. The hulling apparatus according to claim 1 further comprising means for rotating said first shaped component.

8. The hulling apparatus according to claim 7, wherein said means for rotating said first shaped component includes a motor and a gear assembly configured to rotate a drive shaft attached to said first shaped component.

9. The hulling apparatus according to claim 1, wherein said second shaped member includes one or more screened panels, each of said screened panels having a plurality of openings therein for passing at least a portion of said outer hull portion of said food products from said hulling chamber after separation from said food products by said contact element.

10. The hulling apparatus according to claim 9, wherein said screened panels have at least one downwardly extending spiral member engageable by said food products in said hulling chamber so as to guide movement of said food product along said product path.

11. The hulling apparatus according to claim 1, wherein said second shaped component has at least one downwardly extending spiral member engageable by said food products in said hulling chamber so as to guide movement of said food product along said product path.

12. The hulling apparatus according to claim 1 further comprising a skirt member at one end of said second shaped component to direct said food products into an outlet after removing said outer hull portion from said food products in said hulling chamber.

13. The hulling apparatus according to claim 1, wherein said jack assembly comprises a pair of worm gear screw jacks attached to said moveable support frame.

14. The hulling apparatus according to claim 1, wherein said hulling apparatus employs gravity to pass said food products along said product path and through said hulling chamber.

15. The hulling apparatus according to claim 1, wherein said food products are walnuts or pecans and said outer hull portion is relatively softer than said inner shell portion of said food product.

16. The hulling apparatus according to claim 1, wherein said contact element has one or more brush assemblies, each of said brush assemblies having a plurality of bristles.

17. The hulling apparatus according to claim 16, wherein each of said one or more brush assemblies comprises a panel configured to be removably attached to said first shaped component, said bristles mounted to said panel so as to project into said hulling chamber during operation of said hulling apparatus.

18. The hulling apparatus according to claim 1, wherein said outlet discharges said inner shell portion of said food products to a rotating washer assembly.

19. A hulling apparatus for substantially removing an outer hull portion of a food product from an inner shell portion of said food product, said hulling apparatus comprising:

a main frame assembly having a plurality of upright frame members and a plurality of transverse frame members;

a moveable support frame slidably mounted to said main frame for movement of said moveable support frame relative to said main frame;

a jack assembly operationally attached to said moveable support frame to move said moveable support frame;

a pair of shaped components having a first shaped component rotatably attached to said main frame and a second shaped component attached to said moveable support frame, said first shaped component substantially disposed in said second shaped component so as to define a hulling chamber between said pair of shaped components, said hulling chamber having a product path therebetween for passage of said food products through said hulling apparatus during movement of said first shaped component and/or said second shaped component relative to each other, said second shaped member having one or more screened panels, each of said screened panels having a plurality of openings therein for passing at least a portion of said outer hull portion of said food products from said hulling chamber;

a contact element attached to said first shaped component, at least a portion of said contact element disposed in said hulling chamber between said first shaped component and said second shaped component and configured to engage said food products so as to remove said outer hull portion of said food products from said inner shell portion while passing said food products through said hulling chamber, said contact element having one or more brush assemblies, each of said brush assemblies having a plurality of bristles; and means for rotating said first shaped component.

20. The hulling apparatus according to claim 19, wherein said moveable support frame is slidably connected to one or more of said upright frame members, said moveable support frame having a pair of vertical channel members slidably mounted in spaced juxtaposition on a pair of upright frame members and a cross-member disposed between said pair of vertical channel members.

21. The hulling apparatus according to claim 19 further comprising a support member attached to said main frame above said moveable support frame and a bottom frame member spatially opposite said support frame below said moveable support frame, said first shaped component being rotatably disposed between said support member and said bottom frame.

22. The hulling apparatus according to claim 19, wherein said first shaped component and said second shaped component are conically shaped so as to define a substantially conical hulling chamber therebetween.

23. The hulling apparatus according to claim 19, wherein said means for rotating said first shaped component includes a motor and a gear assembly configured to rotate a drive shaft attached to said first shaped component.

24. The hulling apparatus according to claim 19, wherein said first shaped component has a shaped cap member for directing said food products into said hulling chamber.

25. The hulling apparatus according to claim 19, wherein said screened panels have at least one downwardly extending spiral member engageable by said food products in said hulling chamber so as to guide movement of said food product along said product path.

26. The hulling apparatus according to claim 19 further comprising a skirt member at one end of said second shaped component to direct said food products into an outlet after removing said outer hull portion from said food products in said hulling chamber.

27. The hulling apparatus according to claim 19, wherein said jack assembly comprises a pair of worm gear screw jacks attached to said moveable support frame.

28. The hulling apparatus according to claim 19, wherein said hulling apparatus employs gravity to pass said food products along said product path and through said hulling chamber.

29. The hulling apparatus according to claim 19, wherein each of said one or more brush assemblies comprises a panel configured to be removably attached to said first shaped component, said bristles mounted to said panel so as to project into said hulling chamber during operation of said hulling apparatus.

30. A hulling apparatus for substantially removing an outer hull portion of a food product from an inner shell portion of said food product, said hulling apparatus comprising:
a main frame assembly having a plurality of upright frame members and a plurality of transverse frame members;
a moveable support frame slidably mounted to said main frame for movement of said moveable support frame relative to said main frame;
a jack assembly operationally attached to said moveable support frame to move said moveable support frame;
a pair of shaped components having a first shaped component rotatably attached to said main frame and a second shaped component attached to said moveable support frame, said first shaped component substantially disposed in said second shaped component so as to define a hulling chamber between said pair of shaped components, said hulling chamber having a product path therebetween for passage of said food products through said hulling apparatus during movement of said first shaped component and/or said second shaped component relative to each other;
a skirt member at one end of said second shaped component to direct said food products into an outlet after removing said outer hull portion from said food products in said hulling chamber; and
a contact element attached to said first shaped component, at least a portion of said contact element disposed in said hulling chamber between said first shaped component and said second shaped component and configured to engage said food products so as to remove said outer hull portion of said food products from said inner shell portion while passing said food products through said hulling chamber.

31. The hulling apparatus according to claim 30, wherein said jack assembly comprises a pair of worm gear screw jacks attached to said moveable support frame.

32. The hulling apparatus according to claim 31, wherein said second shaped member includes one or more screened panels, each of said screened panels having a plurality of openings therein for passing at least a portion of said outer hull portion of said food products from said hulling chamber after separation from said food products by said contact element.

33. The hulling apparatus according to claim 32, wherein said screened panels have at least one downwardly extending spiral member engageable by said food products in said hulling chamber so as to guide movement of said food product along said product path.

* * * * *